United States Patent [19]
Ikeda

[11] Patent Number: 5,327,250
[45] Date of Patent: Jul. 5, 1994

[54] FACSIMILE DEVICE

[75] Inventor: Takeshi Ikeda, Yokohama, Japan

[73] Assignee: Canon Kabushiki Kaisha, Tokyo, Japan

[21] Appl. No.: 29,357

[22] Filed: Mar. 10, 1993

Related U.S. Application Data

[63] Continuation of Ser. No. 885,249, May 20, 1992, abandoned, which is a continuation of Ser. No. 496,636, Mar. 21, 1990, abandoned.

[30] Foreign Application Priority Data

Mar. 31, 1989 [JP] Japan ................................. 1-78334

[51] Int. Cl.$^5$ ............................................. H04N 1/32
[52] U.S. Cl. ..................................... 358/401; 358/498; 358/400
[58] Field of Search ............... 358/400, 401, 474, 476, 358/486, 494, 496, 498, 296, 75; 346/76 PH; 355/75

[56] References Cited

U.S. PATENT DOCUMENTS

| | | | |
|---|---|---|---|
| 4,729,036 | 3/1988 | Ikeda et al. | 358/296 |
| 4,731,667 | 3/1988 | Watanabe et al. | 358/401 |
| 4,768,100 | 8/1988 | Kunishima et al. | 358/285 |
| 4,872,061 | 10/1989 | Uchiyama | 358/400 |
| 5,072,307 | 12/1991 | Shirakoshi et al. | 358/400 |

FOREIGN PATENT DOCUMENTS 64-13356  1/1989  Japan.

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An operation control function, a system control function and a network control function of a facsimile device are incorporated in one printed circuit board, and a substantially entire area of an upper portion of the device is allotted for the area to accommodate the one printed circuit board. The entire upper portion of the device is pivotable between an open position and a closed position and separated by a sheet feed path when the upper unit is in the open position.

5 Claims, 5 Drawing Sheets

FACSIMILE DEVICE

This application is a continuation of application Ser. No. 07/885,249 filed May 20, 1992, now abandoned, which is a continuation of Ser. No. 07/496,636 filed on Mar. 21, 1990, now abandoned.

BACKGROUND OF THE INVENTION

1. Field of the Invention

The present invention relates to a facsimile device equipped with a printed circuit board having major functions on an upper cover.

2. Related Background Art

A conventional facsimile device is constructed as shown in FIG. 1, as taught by U.S. Pat. No. 4,768,100.

A document sheet 102 mounted on a document sheet table 101 is fed from the right to the left in FIG. 1 by rollers 103, 104, 105 and 106 of the document sheet feeding means.

In the course of feed 107, the document sheet is illuminated by a light from a light source 108, and a reflected light is directed to mirrors 109 and 110, passes through a lens 111, is focused onto a photoelectric conversion element 112 such as a charge coupled device (CCD), and is converted to an electrical signal. Arranged above the document sheet feed means 103–106 is a printed circuit board which controls the function of operation (hereinafter referred to as OP CNT board), switching means is arranged thereon to permit external entry by an operator.

An upper half of the document sheet feed means 103–106 is accomodated in an operation panel unit which is operable around 114 in a direction of arrow A. Thus, when the document sheet jams, it can be readily removed by exposing the feed path.

A roll-shaped thermal record sheet 115 is located as shown at the center of the drawing, and printing is done thereon by cooperation of a thermal head 116 arranged below the document sheet table and a platen roller 117. The record sheet is fed out in a direction of arrow B.

Numeral 118 denotes a power supply, numeral 119 denotes a system control printed circuit board (SCNT board), and numeral 120 denotes a network control unit (NCU board) used for the connection with a telephone line. Power lines and signal lines (not shown) extend between the OP CNT board 113 and the SCNT board 119 and between the NCU board 120 and the SCNT board 119.

FIG. 2 shows another prior art facsimile device with a telephone set, which is disclosed in Japanese Patent Application Laid-Open No. 64-13356.

When a document sheet 131 is inserted to reach a feed roller 132, the feeding is started. An image is read by an image sensor 133 while the document sheet is pressed and fed in a direction of arrow C by a platen roller 134. An operation panel unit 135 is arranged above the document sheet feed means and an OP CNT board 136 is accomodated therein.

On the other hand, printing is made on a roll-shaped thermal record sheet 137 by cooperation of a thermal head 138 and a platen roller 139, and the record sheet is fed out of the device in a direction of arrow D. Numeral 140 denotes a power supply, numeral 141 denotes a board which includes a combination of the SCNT board 119 and the NCU board 120, and numeral 142 denotes a telephone circuit board which controls a speech network. Power lines and signal lines extend between the OP CNT board 136 and the SCNT board 119 and between the telephone circuit board and the SCNT board 119.

In the above-described prior art facsimile devices, the OP CNT 136 is located at the top due to necessity of operation, but other boards, SCNT 119, NCU 120 and the telephone circuit are distributedly arranged. Accordingly, harnessing is required to interconnect the boards.

The harnessing includes the following problems.

① A space to arrange the harness is required.

② Because the harnessing is done through clearances between mechanical units, a careful safety procedure is required to prevent touching a movable part of the mechanical units and a sharp edge. This lowers freedom of design of the mechanical units and imports various restrictions.

③ A connector to receive the harness is required on each of the boards. This is disadvantageous from a space-cost standpoint.

④ Where the OP CNT board 113 is mounted on the pivotable unit as shown in FIG. 1, the harness must pass through the center of pivot or some slack must be given to the harness. Further, a mechanism to prevent the harness from being bitten when the pivotable unit is opened and closed is required.

⑤ The more the number of harnesses in the device is and the longer the harness is, the more electromagnetic disturbances (EMI) occur. As a regulations on EMI are becoming more sever in these years, the countermeasurement therefor is difficult to attain and requires more cost.

⑥ The more the number of harnesses in the device is, the more trouble occurs with respect to productivity and quality. Accordingly, the reduction of harnesses is desirable.

The above problems relating to the harness may be solved if the respective boards are accomodated in one printed circuit board, but there are many restrictions which make it difficult to accomodate them in one board. Namely, the operation control function must be arranged at the top of the device because of its close relation with the operation panel, there is no sufficient space at the top of the device to accomodate one large printed circuit board, and a reader unit, a document sheet feed path, a record unit and a record sheet feed path are to be arranged to facilitate a process when the sheet jams.

Accordingly, in the prior art facsimile device, it is difficult to accommodate all boards in one printed circuit board, as a result, the problems relating to harnessing arise.

SUMMARY OF THE INVENTION

It is an object of the present invention to solve the problems relating to harnessing by accommodating major functions of a facsimile device in one printed circuit board.

It is another object of the present invention to optimize an arrangement in a facsimile device having one printed circuit board which accommodate major functions.

Other objects of the present invention will be apparent from the following description of the preferred embodiments.

DESCRIPTION OF THE PREFERRED EMBODIMENT

An embodiment of the present invention is now explained with reference to the drawings.

Figure 1:
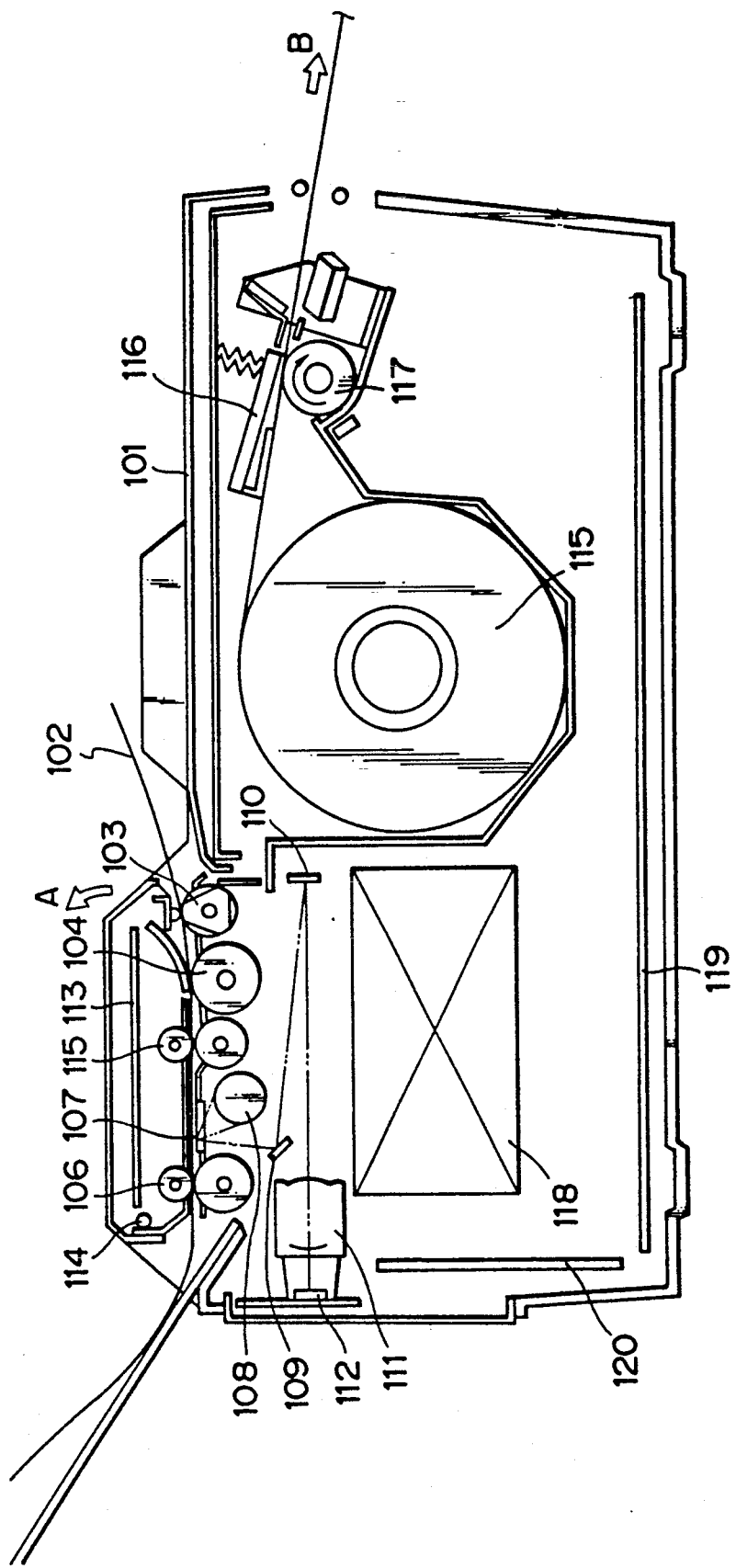
FIG. 1 shows an internal structure of a prior art facsimile device.
Figure 2:
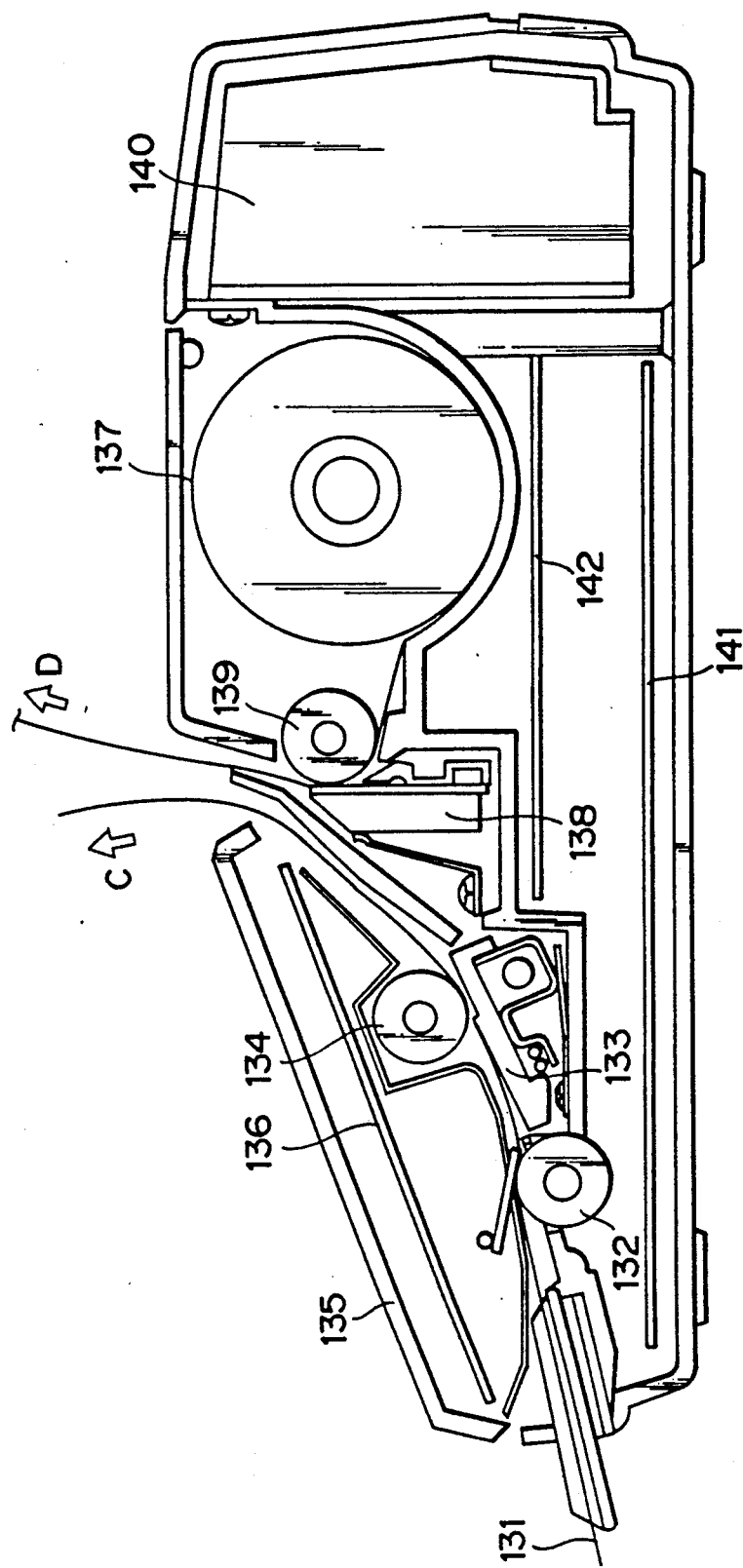
FIG. 2 shows an internal structure of another prior art facsimile device having a telephone set mounted therein.
Figure 3:
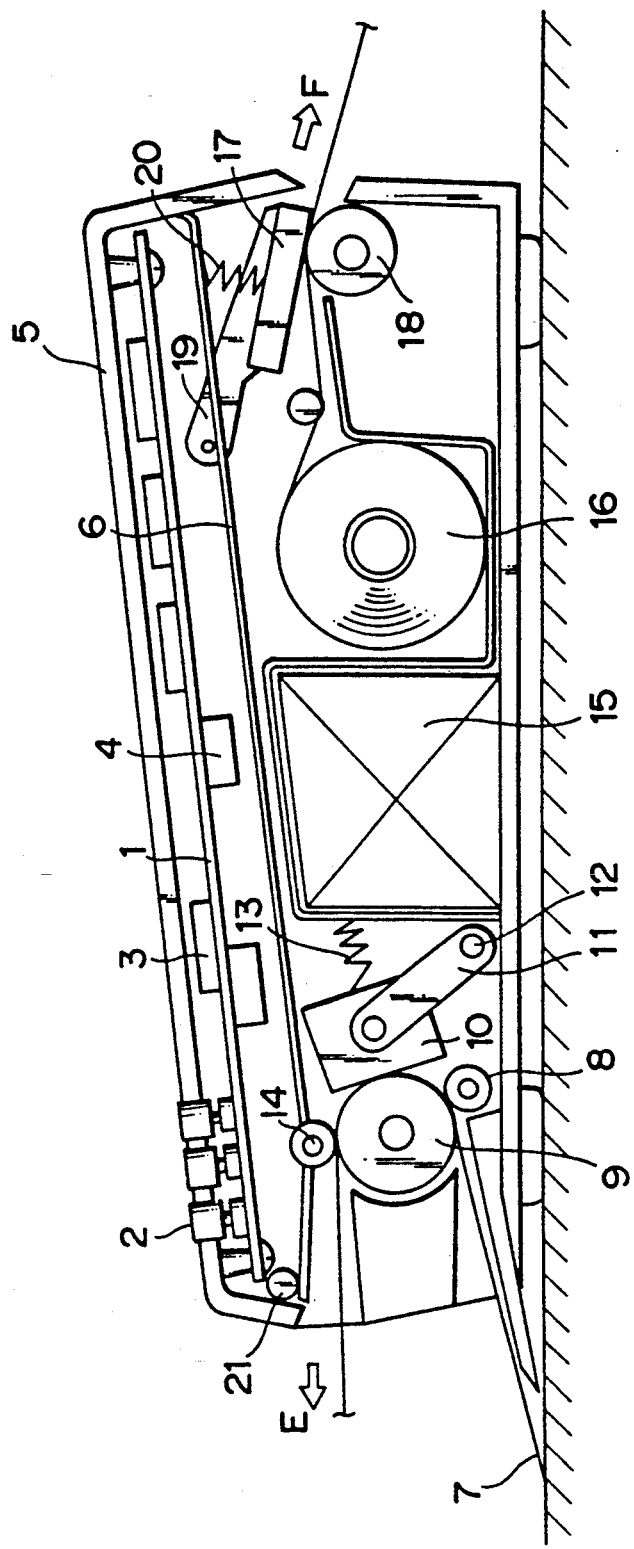
FIG. 3 shows an internal structure of one embodiment of a facsimile device of the present invention.

FIG. 3 shows an internal structure of a facsimile device which comprises an upper unit and a lower unit. Numeral 1 denotes a single printed circuit board which integrates an operation function, a system control function and a network control function. It extends from front to rear (left to right in the drawing) of the device. Arranged on board 1 are a switch 2 to receive an entry from an operation panel, a system control CPU 3, and an NCU let coil 4. The respective functional units are interconnected by printed wires. Numeral 5 denotes an outer cover which accommodates the operation panel and covers the entire top of the device. The printed circuit board 1 is fixed to the inner side of the outer cover 5.

A partitioning plate 6 for partitioning from a lower portion of the device is arranged below the printed circuit board 1 and a gap 1a is formed in the inner side of the outer cover 5. The upper unit comprises the printed circuit board 1 arranged between the outer cover 5 and the partitioning plate 6.

An image sensor 10 which forms a read unit is arranged at one end (left side in FIG. 3) of the lower unit of the facsimile device. The image sensor 10 is pivotably coupled to one end of a lever 11 having the other end thereof pivoted to the lower unit. The image sensor 10 is pivoted around a support point 12 of the lever 11 and is always biased toward a surface of a platen roller 9 by resilient biasing means 13 such as a compressed coil spring. A document sheet feed path which extends between the platen roller 9 and the image sensor 10 is constructed such that a document sheet 7 inserted from a document sheet insertion port in the right direction in the drawing is fed forward and then backward and ejected from the top of the insertion port. An ejection portion of the feed path comprises a portion of the partitioning plate 6.

Figure 4:
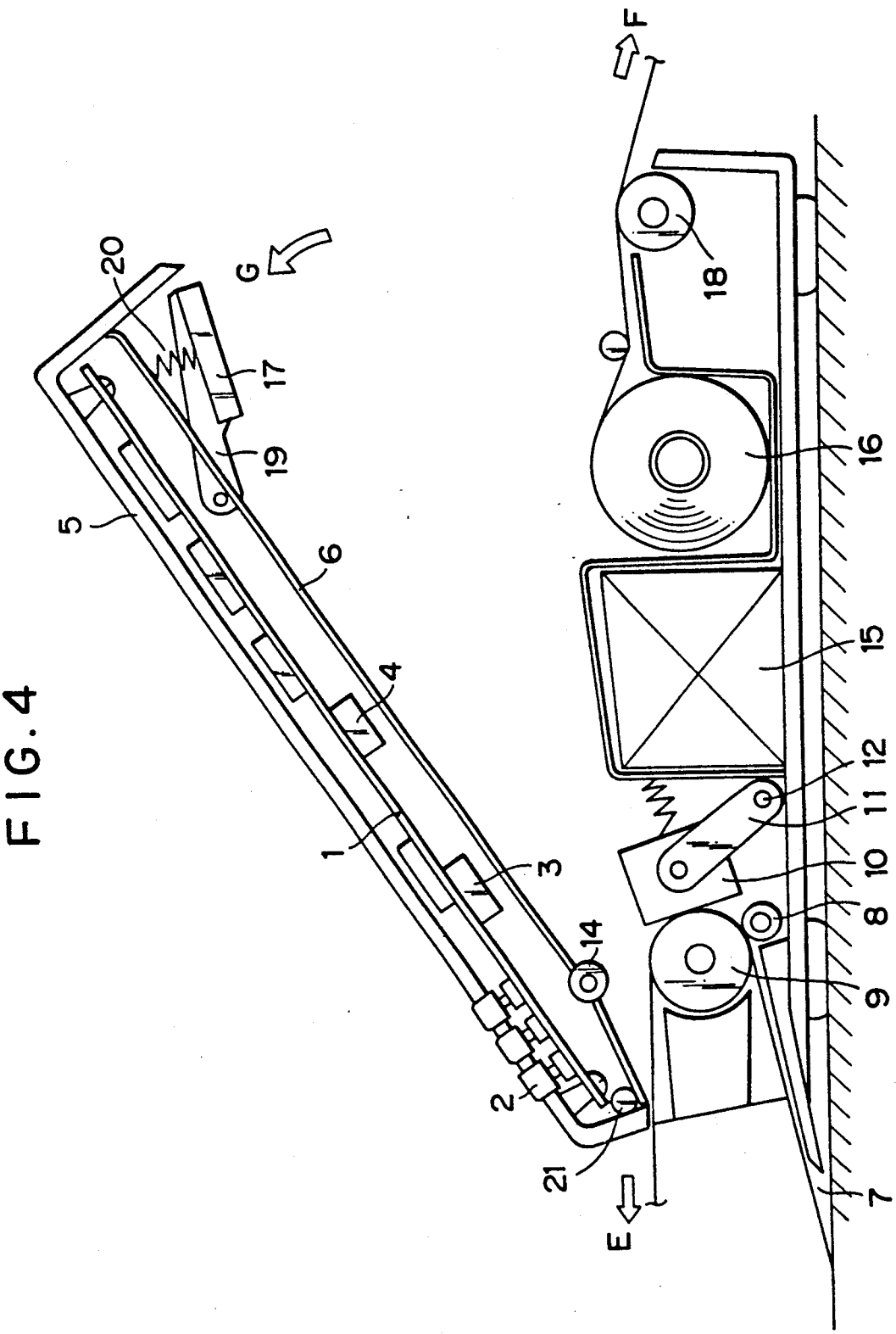
FIG. 4 shows the device of FIG. 3 with a cover thereof opened.

A power supply unit 15 is arranged at the center of the device. A rolled thermal record sheet 16 is received at the rear (right side in the drawing) of the device, and a record unit comprises a thermal head 17 arranged in the upper unit and a platen roller 18. Printing is made by cooperation of the thermal head 17 and the platen roller 18, and the record sheet is fed out of the device in a direction of arrow F. The thermal head 17 is supported on a lever 19 having one end thereof pivoted to the cover 5. It is swingable and biased toward the platen roller 18 by a compressed coil spring 20. The upper unit pivots around a support point 21 in a direction of arrow G, as shown in FIG. 4.

Where the partitioning plate for the upper unit is made of metal, it is effective as an electromagnetic shield of the printed circuit board 1 and can suppress EMI.

The document sheet read operation and the record operation are now explained. When the document sheet is inserted from the document sheet insertion port to the feed roller 8, it is fed into the device by the cooperation of the platen roller 9, and the image is read by the image sensor 10 in the course of the feeding.

The document sheet is then ejected in a direction of arrow E by the cooperation of an ejection roller 14 and the platen roller 9. Namely, it is inserted from the document sheet insertion port in the right direction in the drawing, fed forward and then backward, and ejected from the top of the insertion port.

The printing is made on the rolled thermal record sheet 16 by the cooperation of the thermal head 17 and the platen roller 18, and the record sheet 16 is fed out of the device in the direction of arrow F.

When the record sheet is to be exchanged or the jammed sheet is to be removed, the upper unit is turned around the support point 21 in the direction of arrow G as shown in FIG. 4 to open the upper cover 5. In the open position, since the thermal head 17 and the ejection roller 14 are moved away together with the upper unit, the record sheet is easily exchanged and the jammed sheet is easily removed.

Figure 5:
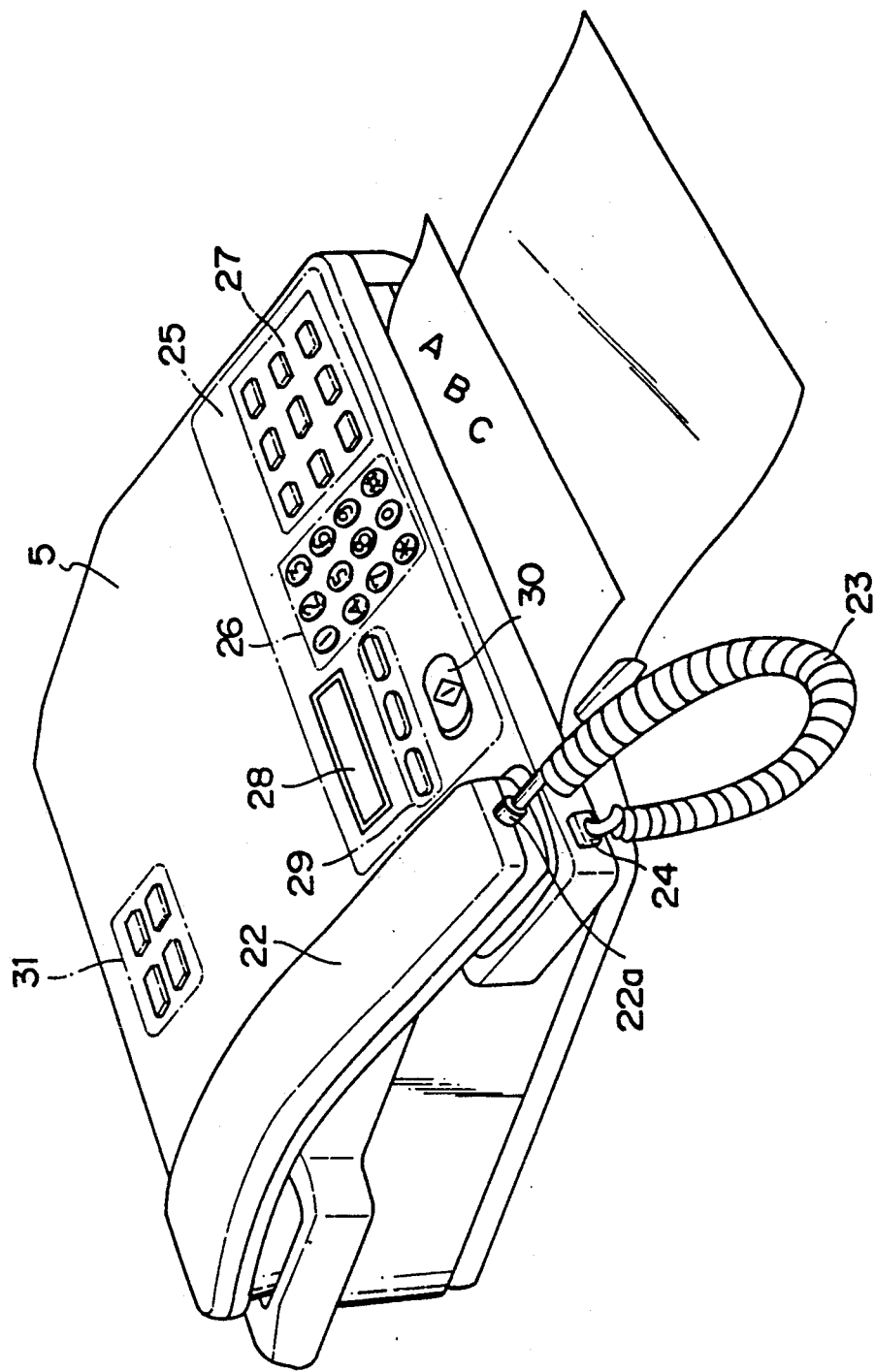
FIG. 5 shows an external view of the device of FIG. 3 with an external shape modified to accommodate a telephone set.

FIG. 5 shows a modification of FIG. 3, in which a telephone function is incorporated and an external view is changed to a slant nose shape.

A handset 22 is arranged on a left side of an upper cover 5, and a curled cord 23 extends from one end 22a of the handset 22 to a portion 24 of the upper cover 25.

An input/output unit mainly for a facsimile function is arranged in a forehand area 25 of the device. It includes numeric keys 26 necessary for calling and registration, one-touch keys 27, a display 28 such as an LCD, function keys 29 for the facsimile device such as contrast selection and line density selection, and a start key 30. On the other hand, other function keys 31 are arranged in a rear area of the device. Those are function keys for the telephone set such as a redialing key, a hold key, and a volume controller for a line monitoring speaker.

Because the facsimile functions and the telephone functions are layed out apart from each other, mismanipulation may be avoided. By arranging the telephone circuit at the corresponding position on the printed circuit board 1 arranged below the upper cover, the functions can be separated and the number of printed wires for interconnection can be reduced.

In accordance with the present embodiment, since the entire area of the upper cover 5 of the device may be used for the operation panel area, more freedom is given than that in the prior art in balancing the separate arrangement of the respective functions on the printed circuit board 1 and the improvement of usability of the design. The respective functions need not be coupled by the harness process, as is done in the prior art but may be connected by the printed wires. Accordingly, the wiring process is facilitated.

A hook switch (not shown) is provided under the handset 22, and it may also be integrated on the printed circuit board 1, thus making the harness process unnecessary.

In accordance with the present invention, the major functions of the facsimile device is accommodated in one printed circuit board, the entire area of the upper cover is used for the space to accommodate the one printed circuit board, and the entire upper cover of the device is pivotable. Accordingly, the operation function, system control unit and network control unit which have heretofore been connected by the harnesses can be interconnected without harnessing. Accordingly, all problems relating to harnessing described above, are solved. Further, since the read unit is arranged on one side and the record unit is arranged on the other side and they are separated from the respective sheet feed paths when the upper unit is in the open position, the exchange of the record sheet and the removal of the jammed sheet are very much facilitated.

I claim:

1. A facsimile device comprising:
   a cover having first and second end portions, said first end portion being disposed at one end portion of said device, and said cover being openable about said one end portion of the device;
   a record unit for recording on a record sheet, said record unit having a first roller provided at a second end portion of the device and a record head provided at said second end portion of said cover to record on the record sheet by cooperating with said roller;
   a read unit for reading a document sheet, said read unit having a second roller for moving the document sheet relative to said read unit, an said read unit being provided at said one end portion of the device, and having a reading element for reading the document sheet by cooperating with said second roller;
   means defining a record sheet feed path for feeding of the record sheet to said recording head and out of said record unit;
   means defining a document sheet feed path for feeding of the document sheet to said reading element and out of said read unit;
   a partitioning member inside said cover and extending from said one end portion to said other end portion of said device, said partitioning member being positioned to define a gap between said partitioning member and said cover, a portion of said partitioning member serving to define a portion of at least one of said record sheet feed path and said document sheet feed path, and a portion of said partitioning member being exposed when said cover is opened; and
   a single printed circuit board arranged in said gap, said single printed circuit board having a key switch for receiving input for an operation controlling function, an element for a system controlling function and an element for a network controlling function, said single printed circuit board being received in and over substantially the entire space of said gap formed by said partitioning member and said cover.

2. A facsimile device according to claim 1 wherein said cover covers a substantially entire area of the device, and said printed circuit board extends thoughout a substantially entire area of the gap of the cover.

3. A facsimile device comprising:
   a power supply unit arranged at a center;
   a record unit arranged on one side with respect to the center, said record unit having a first roller for moving a second sheet relative to said record unit, and a record head for recording on the second sheet by cooperating with said first roller;
   a read unit arranged on another side with respect to the center, said read unit having a second roller for moving a document sheet relative to said read unit, and a reading element for reading a document sheet by cooperating with said second roller;
   a cover having first and second end portions, said first end portion being disposed at one end portion of said device, and said cover being openable about said one end portion of the device, said record head being provided at said second end portion of said cover, said cover exposing most portions of said power supply unit, said record unit and said read unit when said cover is in an open position; and
   a single printed circuit board arranged on an inner side of said cover, said single printed circuit board having a key switch for receiving input for performing an operation control, an element for performing a system control and an element for performing a network control, said single printed circuit board being received in and over substantially the entire space formed in an inner side of said cover.

4. A facsimile device according to claim 3, wherein said switches are arranged on an operation panel of said cover.

5. An image forming apparatus comprising:
   a record unit for recording on a record sheet, said record unit having a first roller for moving the record sheet relative to said record unit, and a record head for recording on the record sheet by cooperation with said first roller;
   a read unit for reading a document sheet, said read unit having a second roller, for moving the document sheet relative to said read unit, and a reading element for reading the document sheet by cooperation with said second roller;
   means defining a record sheet feed path for feeding of the record sheet to said record head and out of said record unit;
   means defining a document sheet feed path for feeding of the document sheet to said reading element and out of said read unit;
   a cover having first and second end portions, said first end portion being disposed at one end portion of said apparatus, and said cover being openable about said one end portion of the apparatus, said record head provided at said second end portion of said cover, and said cover exposing most portions of said record unit and said read unit when said cover is in an open position; and
   a single printed circuit board arranged on an inner side of said cover, said single printed circuit board having a key switch for receiving input for performing operation control, an element for performing a system control and an element for performing a network control, said single printed circuit board being received in and over substantially the entire space formed on the inner side of said cover.

* * * * *

UNITED STATES PATENT AND TRADEMARK OFFICE
CERTIFICATE OF CORRECTION

PATENT NO. : 5,327,250

DATED : July 5, 1994

INVENTOR(S) : TAKESHI IKEDA

It is certified that error appears in the above-identified patent and that said Letters Patent is hereby corrected as shown below:

COLUMN 1

Line 33, "accomodated" should read --accommodated--.
    Line 34, "operable" should read --openable--.
    Line 59, "accomodated" should read --accommodated--.

COLUMN 2

Line 30, "a" should be deleted.
    Line 31, "sever" should read --severe--.
    Line 39, "harness" should read --harnessing--.
    Line 40, "accomodated" should read --accommodated--.
    Line 42, "accomodate" should read --accommodate--.
    Line 46, "accomodate" should read --accommodate--.
    Line 53, "as" should read --and as--.
    Line 64, "accommodate" should read --accommodates--.

COLUMN 4

Line 68, "is" should read --are--.

COLUMN 5

Line 8, "harnessing" should read --harnessing,--.
    Line 29, "an" should read --and--.

UNITED STATES PATENT AND TRADEMARK OFFICE
CERTIFICATE OF CORRECTION

PATENT NO. : 5,327,250
DATED : July 5, 1994
INVENTOR(S) : TAKESHI IKEDA

It is certified that error appears in the above-identified patent and that said Letters Patent is hereby corrected as shown below:

COLUMN 6

Line 63, "on" should read --in--.

Signed and Sealed this

Eighth Day of November, 1994

Attest:

BRUCE LEHMAN

Attesting Officer  Commissioner of Patents and Trademarks